United States Patent [19]

Brooks et al.

[11] Patent Number: 5,483,276
[45] Date of Patent: Jan. 9, 1996

[54] COMPLIANCE INCENTIVES FOR AUDIENCE MONITORING/RECORDING DEVICES

[75] Inventors: Jon R. Brooks, Silver Spring; James M. Jensen, Columbia; Roberta M. McConochie, Annapolis; Susan V. Osborn, Columbia, all of Md.; Amy E. Pearl, Washington, D.C.; Carole M. Schmidt, New Carrollton, Md.; Ann B. Seiler, Annapolis, Md.; Carol P. Stowell, Chevy Chase, Md.; Thomas W. White, Annapolis, Md.; Wylie Wong, Silver Spring, Md.

[73] Assignee: The Arbitron Company, Columbia, Md.

[21] Appl. No.: 101,558

[22] Filed: Aug. 2, 1993

[51] Int. Cl.⁶ .................................................. H04N 7/16
[52] U.S. Cl. ........................................ 348/2; 348/1; 455/2
[58] Field of Search ............................... 455/2; 348/1, 2, 348/4, 5; 358/84; H04N 7/16, 7/173

[56] References Cited

U.S. PATENT DOCUMENTS

| | | | |
|---|---|---|---|
| 4,107,734 | 8/1978 | Percy et al. | 358/84 |
| 4,107,735 | 8/1978 | Frohbach | 358/84 |
| 4,258,386 | 3/1981 | Cheung | 358/84 |
| 4,308,554 | 12/1981 | Percy et al. | 358/84 |
| 4,567,511 | 1/1986 | Smith et al. | 358/84 |
| 4,584,602 | 4/1986 | Nakagawa | 358/84 |
| 4,626,904 | 12/1986 | Lurie | 358/84 |
| 4,642,685 | 2/1987 | Roberts et al. | 358/84 |
| 4,646,145 | 2/1987 | Percy et al. | 358/84 |
| 4,652,915 | 3/1987 | Heller, III | 455/2 |
| 4,658,290 | 4/1987 | McKenna et al. | 455/2 |
| 4,695,879 | 9/1987 | Weinblatt | 358/84 |
| 4,697,209 | 9/1987 | Kiewit et al. | 455/2 |
| 4,718,106 | 1/1988 | Weinblatt | 455/2 |
| 4,779,198 | 10/1988 | Lurie | 455/2 |
| 4,907,079 | 3/1990 | Turner et al. | 358/84 |
| 4,955,070 | 9/1990 | Welsh et al. | 455/2 |
| 4,973,952 | 11/1990 | Malec et al. | 340/825.35 |
| 5,023,929 | 6/1991 | Call | 455/2 |
| 5,155,762 | 10/1992 | Croquet et al. | 379/92 |

FOREIGN PATENT DOCUMENTS

| | | | |
|---|---|---|---|
| 2033558 | 9/1991 | Canada | H04H 9/00 |
| WO91/11062 | 7/1991 | WIPO | H04H 9/00 |
| WO9307689 | 4/1993 | WIPO | H04H 9/00 |

*Primary Examiner*—James J. Groody
*Assistant Examiner*—Chris Grant
*Attorney, Agent, or Firm*—Curtis, Morris & Safford; Eugene L. Flanagan, III

[57] ABSTRACT

Systems and methods are provided for promoting use by an audience member of a portable broadcast exposure monitoring and/or recording device in accordance with a predetermined usage criterion. A sense signal is provided indicating whether the device is being carried with the person of the audience member, and a time signal corresponding with the sense signal is also provided. An indication to the audience member of whether the audience member's usage of the device has been in accordance with the predetermined usage criterion is provided based on the sense signal and the corresponding time signal.

66 Claims, 3 Drawing Sheets

COMPLIANCE INCENTIVES FOR AUDIENCE MONITORING/RECORDING DEVICES

BACKGROUND OF THE INVENTION

The present invention relates to methods and apparatus for promoting compliance by audience members with broadcast exposure monitoring procedures.

Various systems exist for monitoring the exposure of an audience member to media broadcasts, such as radio and television. As used herein, the terms "broadcast" and "broadcasts" include, without limitation, real-time broadcasts (whether over-the-air, via cable, satellite, fiber optic or other transmission medium), playback of recordings of broadcast segments, pre-recorded programming and other forms of widely disseminated information.

Conventional methods require that the audience member provide an indication of the broadcasts to which she or he has been exposed. Such methods typically involve conversations with media exposure survey personnel, the use of paper diaries or push-button devices. For example, in one proposed technique, a portable audience response system provides a handheld unit having push-buttons to each audience member, and a central processor polls the units wirelessly to collect the audience responses.

These conventional methods rely on the audience member's awareness that he or she is being exposed to a broadcast, remembering to record such exposure, and actually recording the same. In view of the burden placed on the audience member, these methods are generally less preferable than automatic methods.

A system for passively logging the presence and identity of television viewers has been proposed in U.S. Pat. No. 4,626,904 (Lurie) in which each viewer wears headphones to receive the audio portion of a program. The headphones include a heat or pressure sensor for detecting the placement of the headphones on the viewer's head. The headphones wirelessly transmit an identification based on the sensor's output to a monitor, and wirelessly receive the audio portion of the program. The monitor stores the identification with a timestamp. However, audience members may not wish to wear headphones, and the system is implemented for a particular home television set, rather than the various broadcast sources to which an audience member is actually exposed.

When monitoring reception of broadcasts by audience members, use of a portable device carried with the person is preferred, as such a device can detect exposure at locations both inside and outside the home of the audience member. A problem with proposed devices of this type is that the audience member is unaware whether or not the monitor is functioning properly. The audience member may also be unaware of a failure to use or maintain the device properly.

Use of a portable broadcast exposure monitoring device presents a challenge to an entity conducting a media exposure survey of motivating the audience member to carry the monitoring device with her or his person. In many applications, moreover, it is necessary for the audience member to return the monitoring device to a docking unit periodically, for example, nightly, to recharge batteries and dump data.

OBJECTS AND SUMMARY OF THE INVENTION

Therefore, an object of the present invention is to provide systems and methods for promoting compliance by an audience member with broadcast audience survey procedures which alleviate the aforementioned shortcomings and disadvantages.

Another object of the present invention is to promote use by an audience member of a portable broadcast exposure monitoring and/or recording device.

Still another object of the present invention is to encourage usage by an audience member of a portable broadcast exposure monitoring and/or recording device in accordance with a predetermined usage criterion.

In accordance with one aspect of the invention, systems and methods for promoting use by an audience member of a portable broadcast exposure monitoring and/or recording device in accordance with a predetermined usage criterion, comprise the means for, and the steps of, respectively: providing a sense signal indicating whether the device is being carried with the person of the audience member, providing a time signal corresponding with the sense signal, and providing an indication to the audience member based on the sense signal and the corresponding time signal of whether the audience member's usage of the device has been in accordance with the predetermined usage criterion.

In accordance with another aspect of the invention, systems and methods for promoting use by an audience member of a portable broadcast exposure monitoring and recording device in accordance with a predetermined usage criterion are provided, wherein the device is operative to receive a broadcast audio signal having an identification signal in encoded form therein, decode the encoded identification signal and store the decoded identification signal with a corresponding time signal. The systems and methods comprise the means for, and the steps of, respectively: providing a sense signal indicating whether the device is being carried with the person of the audience member; providing a time signal corresponding with the sense signal; and providing an indication to the audience member based on the sense signal and the corresponding time signal of whether the audience member's usage of the device has been in accordance with the predetermined usage criterion.

In accordance with a further aspect of the invention, systems and methods for promoting usage by an audience member of a portable broadcast exposure monitoring and/or recording device in accordance with a predetermined usage criterion are provided, the device being operative to acquire and/or store broadcast exposure data and to couple with a data transfer system under the control of the audience member to provide data to the data transfer system from the device. The systems and methods comprise the means for and the steps of, respectively: providing a sense signal in response to coupling of the monitoring device with the data transfer system, providing a time signal corresponding with the sense signal, providing a compliance signal indicating whether the device was coupled with the data transfer system within a predetermined coupling time frame based on the sense signal and the corresponding time signal, and providing an indication to the audience member based on the compliance signal of whether the audience member has coupled the device with the data transfer system within the predetermined coupling time frame.

In accordance with still another aspect of the present invention, systems and methods for promoting usage by an audience member of a portable broadcast exposure monitoring and recording device in accordance with a predetermined usage criterion are provided, in which the device is operative to receive a broadcast audio signal having an identification signal in encoded form therein, decode the encoded identification signal, store the decoded identification signal with a corresponding time signal, and couple with a data transfer system under the control of the audience member to provide the decoded identification signal and corresponding time signal to the data transfer system from the device. The systems and methods comprise the means for, and the steps of, respectively: providing a sense signal in response to coupling of the device with the data transfer system; providing a sense time signal corresponding with the sense signal; providing a compliance signal indicating whether the device was coupled with the data transfer system within a predetermined coupling time frame based on the sense signal and the corresponding sense time signal; and providing an indication to the audience member based on the compliance signal of whether the audience member has coupled the device with the data transfer system within the predetermined coupling time frame.

In accordance with a still further aspect of the invention, systems and methods are provided for promoting use by an audience member of a portable broadcast exposure monitoring and/or recording device in accordance with a predetermined usage criterion, comprising the means for and the steps of, respectively: providing a sense signal indicating whether the device is being carried with the person of the audience member, providing an operational state signal from time to time, the operational state signal indicating whether the device is in an operating state for monitoring broadcast exposure, and providing a plurality of indications to the audience member, each of the plurality of indications being provided at a different respective time, each of the plurality of indications indicating that the device is in the operating state based on the operational state signal and the sense signal.

In accordance with yet still another aspect of the invention, systems and methods are provided for promoting use by an audience member of a portable broadcast exposure monitoring and recording device in accordance with a predetermined usage criterion, the device being operative to receive a broadcast audio signal having an identification signal in encoded form therein, decode the encoded identification signal and store the decoded identification signal with a corresponding time signal, comprising the means for, and the steps of, respectively: providing a sense signal indicating whether the device is being carried with the person of the audience member; providing an operational state signal from time to time, the operational state signal indicating whether said device is in an operating state for monitoring broadcast exposure; and providing a plurality of indications to the audience member, each of the plurality of indications being provided at a different respective time, each of the plurality of indications indicating that the device is in the operating state based on the operational state signal and the sense signal.

The above, and other objects, features and advantages of the present invention will be apparent in the following detailed description of certain advantageous embodiments thereof which is to be read in conjunction with the accompanying drawings in which corresponding elements are each identified by the same reference numeral.

DETAILED DESCRIPTION OF CERTAIN ADVANTAGEOUS EMBODIMENTS

Figure 1:
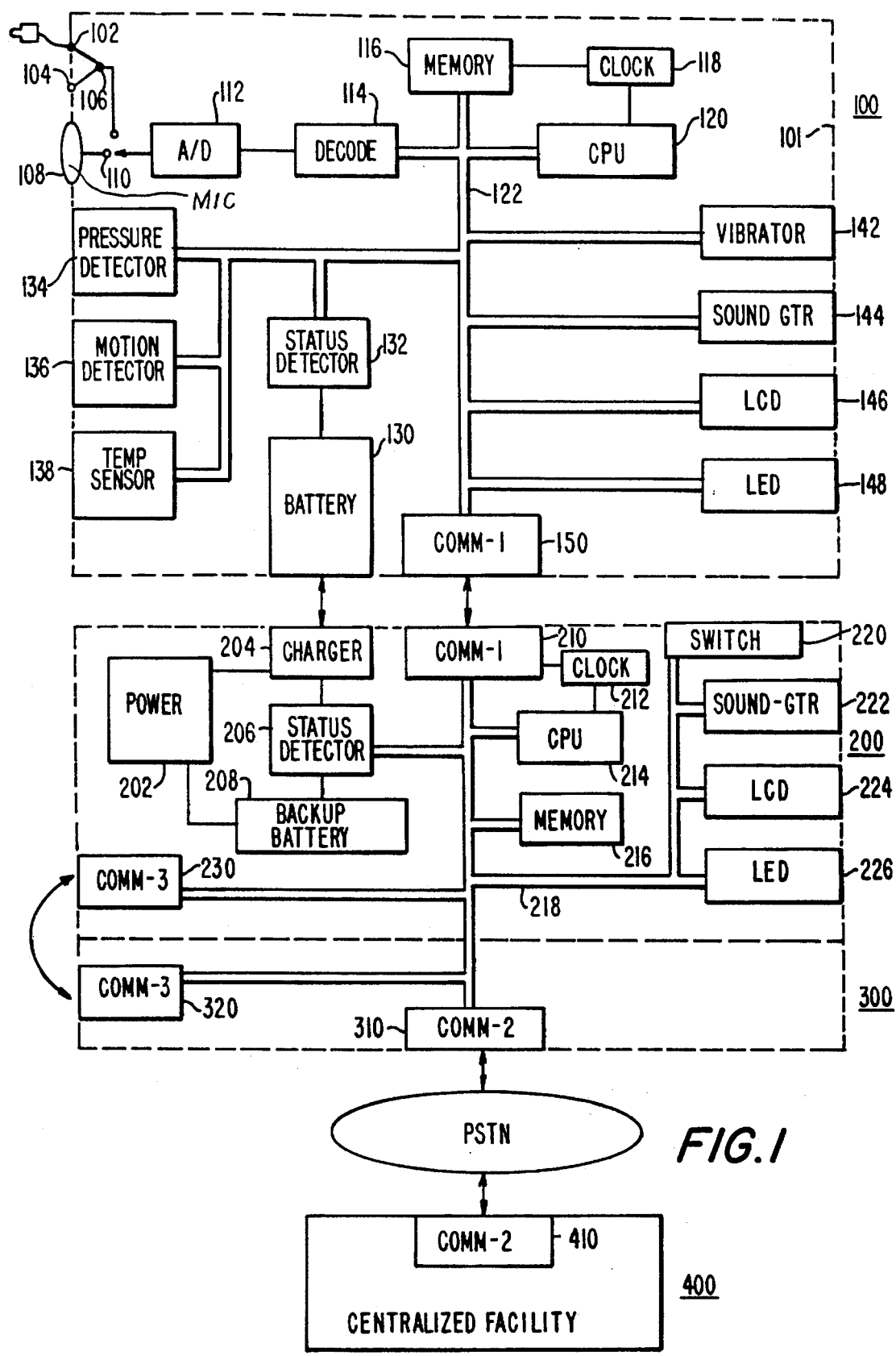
FIG. 1 is a block diagram of a system for broadcast exposure monitoring in which the present invention is applied.

Referring now to the drawings, and in particular to FIG. 1, there is illustrated a broadcast exposure monitoring system in which the present invention is applied. The monitoring system includes a portable broadcast exposure monitoring device 100, a docking station 200, a hub 300 and a centralized data processing facility 400.

The monitoring device 100 is adapted to sense whether it is being carried with the person of an audience member, to detect and decode encoded signals in broadcast information, and to record data indicating exposure of the audience member to such broadcast information. The device 100 produces sense signals indicating that it is "being carried", stores the sense signals with corresponding timestamps, also stores the decoded signals with corresponding timestamps, and uploads the stored information to the docking station 200. The device 100 also functions to provide indications to an audience member regarding its present status and reflecting previous activity.

A data transfer system, also referred to herein as a base station, comprises the docking station 200 and the hub 300. The docking station 200 is adapted to receive uploaded information from the monitoring device 100, and to provide indications to an audience member based on the uploaded information and also in response to selected activity or occurrences, such as elapsed time since a defined event. Through the hub 300, the docking station 200 functions to upload information to the centralized facility 400, and to receive information therefrom, via dial-up lines provided by the public switched telephone network (PSTN).

Each audience member is assigned her or his own monitoring device 100. Generally, each household is provided with one docking station 200 for each monitoring device 100, and with one hub 300 having telephone line access. For brevity of description, the data transfer system including both docking station 200 and hub 300 is described herein as a single unit. It will be appreciated that the docking station 200 may instead communicate through a separate hub 300 and that multiple docking stations 200 in the household may share a single hub 300. The hub 300 is generally in accordance with U.S. Pat. No. 4,912,552 which teaches a system for collecting broadcast exposure information and transmitting it to a centralized facility using a hub such as hub 300.

In an alternate configuration, no hub is present in the household, and instead devices 100 are physically delivered, e.g., mailed, to a centralized data processing facility at periodic times, e.g., weekly, where the data recorded in each of the monitoring devices is uploaded to the centralized facility. In a further alternative configuration, data from the device 100 is transferred to the docking station 200 and stored thereby in a memory card (not shown for purposes of simplicity and clarity). At a future time, the memory card is removed, a fresh memory card is coupled with the station 200 in its place and the removed card is delivered to the centralized data processing facility for uploading of the data stored therein.

The present invention provides an incentive or incentives for improving an audience member's compliance with procedures for carrying out broadcast exposure surveys. The terms "incentive" and "incentives" as used herein include, without limitation, motivations for future behavior as well as feedback and rewards contingent on prior behavior.

An immediate form of incentive for carrying a personal broadcast exposure monitoring device is provided through the device itself and comprises one or more indications that the device is functioning properly and being used in accordance with predetermined usage criteria. From the perspective of an audience member, the personal monitoring device should be sensing when it is carried with the person, detecting media exposure, and assuring its batteries have sufficient charge. The predetermined usage criteria may include carrying the device during waking hours, carrying the device during times when the audience member is likely to be exposed to media broadcasts or recordings, or carrying the device for another predetermined interval or intervals, as well as returning the device to its docking station at certain intervals or at a certain time, e.g., daily, or at certain times of day, or when the device itself indicates it needs to be docked.

Incentive rewards for carrying the personal monitoring device and ensuring that it is returned to the docking station as prescribed are provided after analysis of the information collected by the monitoring device relevant to compliance.

Rewards are indicated after analysis of data collected by the monitoring device. For the configuration shown in FIG. 1, part of this analysis occurs in the base station, and generally comprises indicating cumulative activity to the audience member and providing messages to him or her acknowledging his or her appropriate behavior. The cumulative activity comprises, for example, total carrying time of the device for the present "day", with the day being measured over a 24-hour period or defined as a calendar day. The cumulative activity may also include whether the device was docked within a predetermined coupling time frame such as "after at least 30 minutes of use and either before a low battery indication or within one hour of a low battery indication." It will be appreciated that, alternatively or additionally, the monitoring device 100 may perform analysis on the collected data and provide indications of the results of its analysis. In particular, the docking station 200 and/or hub 300 in certain embodiments analyze data relevant to compliance based on criteria stored therein to determine whether the audience member has won a reward as an incentive. If so, the docking station 200 provides an indication of the reward to the audience member, for example, an alpha-numeric display of a prestored message such as, "Because you have correctly used your 'meter' for (X) consecutive days, you have won a prize. Please call ..." The variable X is determined from the data.

In certain embodiments, further analysis for determining such rewards is conducted in the centralized facility and generally results in detailed indications of cumulative activity, such as "total carrying time of the device since the start of a survey" or "number of times the device was docked within the predetermined coupling time frame since the start of the survey", along with notification that a reward has been earned such as cash, merchandise or other item or entitlement.

Other rewards are provided from time-to-time by the centralized facility in return for past compliance with usage criteria. For example, a bonus reward, such as an amount of money, may be given to a randomly selected audience member who was either carrying the device with her or his person at a particular time or whose monitoring device was recharging after being carried. To further motivate compliance with survey procedures, such a bonus incentive may be given on the condition that the monitoring device is coupled to the docking station during a predetermined time after the centralized facility has been enabled by authorized personnel to notify the audience member of the bonus. Advantageously, all audience members are notified when such a reward is awarded to one audience member to strengthen their belief that carrying their monitoring device can lead to a reward.

In certain embodiments, a reward is made to an audience member selected at random from a predetermined "panel" of audience members (a grouping selected according to time and/or geographic area), but conditioned on the selected member's compliance with predetermined survey criteria in a randomly selected time period on a predetermined award day. Such rewards are made from time to time for different panels and based on compliance during different time periods. Once the particular audience member has been selected by the centralized facility 400, data indicating the selection is transmitted thereby to the hub 300 in the selected member's household and is provided by the hub 300 to the corresponding docking station 200 (or to all of the docking stations of the corresponding household where multiple docking stations are served by a single hub). For example, if data transfer from the centralized facility only occurs daily, the selection data is transmitted the day before the award day. The docking station 200 stores the selection data until the award day and at that time determines whether the selected audience member has complied with predetermined criteria. In certain implementations such criteria are that (1) the device 100 was removed from the docking station 200 on the award day, (2) the device was carried for a given period of time during that day, and (3) the device was returned to the docking station 200 before a predetermined time, such as prior to a predetermined time period during which the docking station 200 communicates through the hub 300 with the centralized facility.

In certain other embodiments, those audience members falling within a preselected highest percentile of all participating audience members based on the number of hours during which each carried her or his respective device 100 is determined by the centralized facility 400 based on compliance related data gathered by the devices 100. Then the centralized facility selects an audience member at random from among those falling within the preselected highest percentile and transmits an appropriate award message to the selected member's base station for display.

In still other embodiments, all audience members whose devices 100 sense that they are being carried at a randomly selected time are within a pool from which one member is selected at random as a winner to receive an award. In the alternative, the pool includes members whose devices 100 have indicated they have been carried in accordance with a cumulative time criterion.

Monitoring device 100 comprises an enclosure 101, terminals 102, 104, splitter 106, microphone 108, switch 110, analog to digital (A/D) converter 112, decoder 114, memory 116, clock 118, processor 120, bus 122, battery 130, battery status detector 132, pressure detector 134, motion detector 136, temperature sensor 138, vibrator 142, sound generator 144, liquid crystal display (LCD) 146, light emitting diode (LED) 148, and communications interface 150.

Pressure detector 134, motion detector 136 and temperature sensor 138 function each to provide sense signals indicating whether the device is being carried by an audience member. Pressure detector 134 is adapted to provide an indication of pressure caused by, for example, being touched by a finger. Motion detector 136 is adapted to provide an indication of its own movement, and thus, movement of the monitoring device 100. An example of a motion detector suitable for use in a portable unit such as the monitoring device 100 is a tilt sensor such as a Series 2009-X4 Motion Detecting Mercury Switch from Signal Systems, International, Inc. in Lavallette, N.J., having a central contact, a plurality of contacts around its edge and a mercury bubble which moves and closes one or more of the contacts when the tilt sensor is moved. Each contact is coupled to a connection wire. Examination of the signal on each connection wire reveals whether the respective contact is closed or open. Temperature sensor 138 is adapted to provide a sensed temperature signal when the sensed temperature is in a predetermined range, for example, the range of the average human body temperature, or a range downloaded into the device 100.

One or more of these sense signals are provided to processor 120 via bus 122, depending on which of these sensors is present in the device 100. If multiple sensors are provided, the processor 120 may require a particular combination of sensing to determine that the device is being carried with the person, for example, motion detection combined with a temperature in the human body range.

The processor 120 is adapted to determine whether the device 100 is being carried based on signals from one or more of pressure detector 134, motion detector 136, and temperature sensor 138. When the processor makes a determination that the device 100 is or is not being carried, it functions to store this determination in memory 116 via bus 122 along with the current time and possibly date, based on a time signal from the clock 118, which may be, for example, an oscillator and a counter, or other appropriate circuits. Advantageously, only information representing a change in whether or not the device is being carried is stored.

When the processor 120 determines that the device 100 is being carried with the person of an audience member, it functions to provide an appropriate indication to the audience member through one or more of vibrator 142, sound generator 144, LCD 146 and LED 148.

Vibrator 142 is adapted to gently vibrate the monitoring device 100, and is generally used for indications in which the audience member ought to take some action such as returning the device 100 to its docking station. Sound generator 144 is adapted to produce one or more sounds, such as a soft beep, a loud beep, a chirp and a scream, or to "speak" one of a set of predetermined messages, or to perform voice synthesis. LCD 146 is adapted to display text and characters to the audience member and could also be readily implemented by any alphanumeric/graphic-type small size display, such as a plasma or other display. LED 148 is adapted to emit light in response to a signal supplied from processor 120, and may comprise one or more LEDs or other simple displays.

In certain embodiments the LED 148 is actuated by the processor 120 to blink on and off at a first rate to indicate that the device 100 is operating to detect and store broadcast exposure data provided that the processor has determined that the device 100 is being carried with the person of an audience member, and to blink at a second rate to indicate that device 100 is operative but in a rest or standby mode. In the absence of any emissions by the LED 148, the audience member is thereby notified to take certain action such as to carry the device or to dock it with its corresponding docking station 200. In the alternative, the LED 148 can be caused to blink rapidly to indicate that the battery is low and the device 100 must be docked for recharging. In that event, the absence of any blinking by the LED 148 can indicate a standby condition and "pick me up". In other embodiments a plurality of LED's are used in place of a single LED 148 to provide color coded messages (using LED's that emit different colors) or a fuel gauge-type display for indicating charge remaining in battery 130.

In certain embodiments the LCD 146 provides a display of one or more icons such as fuel gauge-type icons representing remaining relative battery charge and/or memory status, or a pulsating icon (such as a trademark) to indicate that the device 100 is operating. In addition, in the alternative, the LCD 146 provides a display such as "inoperative, call for repair" if the device 100 fails a self-test. Other incentive messages such as "low battery", "receiving", "pick me up" and/or "are you there?" can be provided by the LCD 146. Still other incentive icons such as a circular or oval shaped icon providing a battery charge indication by turning on or off various sections can be implemented by the LCD 146. Also, a voice synthesizer may be included in the device 100 to emit a verbal message such as "thank you for carrying" the device.

As will be appreciated, monitoring device 100 may include one or more of the above-described indicators for communicating the occurrence of events to the audience member in any one or more of a variety of ways.

Microphone 108 is adapted to transduce an acoustic signal and to provide a corresponding analog electrical signal to a first fixed terminal of the switch 110. A movable terminal of the switch 110 is coupled with an input of the A/D converter 112, so that when the movable terminal of switch 110 is coupled with its first fixed terminal, the signal output by microphone 108 is supplied to the converter 112 which is adapted to perform A/D conversion thereof and to provide the digitized signal to decoder 114. The acoustic signal is processed to determine the presence or absence of an identification signal therein identifying, for example, the source (channel 2) or nature (news) of a broadcast or the specific identity of a program or information to which the audience member has been exposed. The decoder 114 functions to extract the identification information from the digitized signal, and to provide an identification signal to the processor 120 via bus 122. Information used in decoding, such as an algorithm or a decoding key, may be downloaded to the monitoring device 100 or pre-programmed therein.

Monitoring device 100 is adapted to receive an audio signal directly through terminal 104. Splitter 106 functions to provide the audio signal to terminal 102 as well as to a second fixed terminal of switch 110, so that when its movable terminal is coupled therewith, the audio signal received at terminal 104 is supplied to the A/D converter 112 in place of the signal from the microphone 108. This arrangement permits convenient monitoring of radio broadcasts received through a portable radio equipped with earphones.

Processor 120 is also adapted to record the signal from decoder 114 in memory 116 via bus 122 with a timestamp based on the signal from the clock 118 at the time the identification signal is received. The processor also functions to provide an appropriate indication to the audience member via one or more of vibrator 142, sound generator 144, LCD 146 and LED 148.

It is preferred that battery 130, which provides power to operate the unit 100, comprises one or more rechargeable batteries, but it may comprise one or more non-rechargeable batteries. Battery status detector 132 is adapted to sense the amount of charge remaining in battery 130, and to provide a signal indicating whether or not the battery 130 has "low" charge to processor 120 via bus 122. The value for "low"

may be pre-programmed or downloaded into status detector 132.

Processor 120 is further adapted to record the signal from battery status detector 132 in memory 116 via bus 122 with a timestamp based on the signal from the clock 118 at the time the battery status signal is received. The processor also functions to provide an appropriate indication to the audience member via one or more of vibrator 142, sound generator 144, LCD 146 and LED 148. For example, the first occurrence of a "low battery" signal may be indicated by a soft beep, and then an LCD may be activated. After a predetermined time interval of low battery condition, several loud beeps may be provided.

Memory 116 serves to store data provided thereto from bus 122. The processor 120 functions to detect when the amount of data stored in memory 116 is approaching the capacity of the memory, and to provide an indication, through one or more of vibrator 142, sound generator 144, LCD 146 and LED 148, that the device 100 should be docked for uploading data. The memory 116 may be comprised of one or more types of physical memory. It is preferred that memory 116 be able to retain its data even if battery 130 is discharged. More specifically, when the battery charge level reaches a predetermined low level, the device 100 enters an energy saving mode of operation to preserve the contents of memory as long as possible.

When the device 100 is coupled to the docking station 200, one or more of battery status detector 132 and communications interface 150 are adapted to notify the processor 120 of this coupling. The communications interface 150 functions to permit bidirectional communication between the device 100 and the docking station 200.

A typical usage criterion may be that the audience member docked the device within a certain time frame after the device indicated that it needed to be docked. Either or both of the device and the docking station may provide an indication to the audience member when compliance with this criterion has occurred.

Purposes for coupling the device 100 to the docking station include battery recharging, uploading collected data, and receiving information from the centralized data processing facility.

The enclosure 101 of monitoring device 100 may be provided with several attachment points, to accommodate a variety of options for carrying the device, such as a strap, loop, clip, chain, pouch, holder or other suitable means. Carrying of the device 100 with the person of the audience member comprises either attaching to the person or an article of clothing, or having the device nearby but not attached, such as in a bag, pack or other accessory carried with the audience member, or carried by a vehicle or other object accompanying the audience member.

The data transfer system comprises power source 202, battery charger 204, battery status detector 206, backup battery 208, communications interface 210, clock 212, processor 214, memory 216, bus 218, switch 220, sound generator 222, LCD 224, LED 226 and communications interface 310. If the docking station 200 is separate from the hub 300, communications interfaces 230 and 320 may be provided in the docking station 200 and hub 300, respectively, to facilitate communication therebetween. If the docking station 200 and the hub 300 are in the same physical package and are also electrically connected, then one of the interfaces 230 and 320 may be eliminated and the remaining interface retained for communicating with other docking stations 200.

Sound generator 222, LCD 224 and LED 226 are adapted to function in the same manner as sound generator 144, LCD 146 and LED 148. One or more of these elements may be present in the data transfer system, and function to permit the data transfer system to provide indications of various events to the audience member. Messages that might be displayed by the base station include:

THANK YOU FOR PARTICIPATING TODAY;

YOUR DEVICE WAS CARRIED FOR 8 HR. 42 MIN. TODAY;

YOUR TOTAL POINTS: 123;

YOU HAVE QUALIFIED FOR THE SPECIAL PREMIUM—CALL THE PHONE NO. ON YOUR DEVICE FOR MORE INFORMATION.

Foreign language versions of these messages are contemplated.

When the battery 130 of the monitoring device 100 is placed in contact with the battery charger 204, the charger 204 functions to draw charge from power source 202 and provide this charge to battery 130 to recharge battery 130. Battery status detector 206 is adapted to detect whether charger 204 is drawing charge from power source 202, and to provide an indication of such detection to processor 214 via bus 218. On receipt of this indication, the processor 214 functions to do one or more of storing a "recharging device" indication in memory 216 via bus 218, and indicating that recharging is occurring through one or more of sound generator 222, LCD 224 and LED 226.

Backup battery 208 provides power to the data transfer system in the event that power source 202 fails or is unplugged. Battery status detector 206 is also adapted to detect that charge is being drawn from backup battery 208, and to provide an indication of such detection to processor 214 via bus 218. On receipt of this indication, the processor 214 functions to do one or more of storing the "operating from backup battery" indication in memory 216 via bus 218, and indicating that the backup battery is operating, through one or more of sound generator 222, LCD 224 and LED 226. Also, the base unit may provide an indication of when it is properly plugged into an electrical outlet and drawing power from the power source 202.

Communications interface 210 is adapted to couple with communications interface 150. The manner of the coupling may be, for example, electrical or optoelectrical. The interface 210 serves to notify processor 214 that coupling has occurred, and to transfer data from the data transfer system to the device 100, including commands about the data transfer process (e.g., "BEGIN UPLOADING"), parameter updates (e.g., elapsed time from battery charging until when "BATTERY LOW" should be indicated) and messages to be indicated to the audience member.

The interface 210 further functions to transfer data from the device 100 to the memory 216, that is, to upload data, usually comprising the "being carried" sensing and timestamps, the media exposure records and timestamps, and information about other indications provided to the audience member and timestamps. This additional data is used in determining whether the behavior of the audience member meets predetermined criteria. For example, an audience member who repeatedly permits the battery 130 in the device 100 to be substantially discharged ought to be informed that she or he needs to couple the device with the docking station more often.

When all data has been uploaded from the device 100, the interface 210 functions to notify the processor 214 of this event. The processor 214 is adapted to provide an indication that data uploading has finished through one or more of sound generator 222, LCD 224 and LED 226, and to analyze the uploaded data. The analysis may be of differing complexity, e.g., merely detecting whether the uploaded data contains any "being carried" sensing, or combining the uploaded data with previously stored information to produce new summary data. The results of the analysis performed by processor 214 may be stored in memory 216.

The hub 300, in certain embodiments, is also adapted to initiate communication through the household's telephone line (when not otherwise in use) with the centralized facility 400 through the communications interface 310, which includes a modem for establishing a dial-up connection to the centralized facility through the telephone network. In such embodiments, the hub is provided with a suitable processor for managing the communications task. The centralized facility 400 includes a communications interface 410 operative to receive data from one or more data transfer systems. The hub 300 may initiate communication based upon an event such as occurrence of a predetermined time of day, the time of day being determined based on a time signal from clock 212, occurrence of a predetermined elapsed time since the last communication with the centralized facility, and/or receipt of at least a certain quantity of uploaded data from the device 100.

While in communication with the centralized facility, the data transfer system typically transfers (uploads) to the centralized facility any uploaded data from the monitoring device 100 as well as recorded data originated from the transfer system itself, and receives (downloads) data which may include messages to be displayed to the audience member and parameter updates and/or control program updates for the data transfer system itself or the monitoring device 100. Through use of one or more switches, shown as switch 220, the audience member may review past messages, such as by toggling up and down, and also may positively acknowledge a message. Preferably communications with the centralized facility are initiated by the hub 300, although the hub 300 is provided with the ability to receive communications from the centralized facility as described in greater detail hereinbelow.

Operation of the monitoring device 100 to promote its usage by the audience member in accordance with predetermined criteria, will now be described with reference to FIG. 2, which shows a flowchart of its operation.

At step 502, the monitoring device sets an internal timer to zero. This timer may comprise an offset value applied by processor 120 to the time signal from clock 118. The timer is used to define an interval for counting a number of motion sensings. The monitoring device also sets the number of motion sensings NSENSINGS to zero.

At step 504, the monitoring device senses whether or not it is being carried, based on the signals from one or more of pressure detector 134, motion detector 136 and temperature sensor 138, and records such sensing at steps 508 and 506, respectively. Alternatively, the monitoring device could record the sensing only if it is different than the previous sensing.

The monitoring device affirmatively indicates that it is not being carried at step 506 either through a lack of indication (that is, it appears to be "dead" when not carried) or by a specific indication provided as described hereinabove.

At step 508, an affirmative indication that it is being carried is provided. The "being carried" indication may be, for example, a change in color or a blinking of a dedicated LED, a particular image or word being displayed on an LCD, a periodic vibration, a periodic noise or any other suitable indication, such as those described above. Advantageously, the "being carried" indication persists, or occurs from time to time, as long as the monitoring device senses it is being carried, that is, it is not limited to a one-time event that occurs when the device is picked up. An advantage of this persistent indication is that the audience member gains reinforcement that her or his behavior matters, on an ongoing basis.

At step 510, the monitoring device increments the number of motion sensings NSENSINGS, preferably by one.

At steps 512–518, the monitoring device indicates the status of its batteries in a similar manner to the "being carried" indication. At step 512, a determination of whether the battery charge is low is based on the signal from battery status detector 132. Specifically, the monitoring device provides one indication when its battery or batteries are sufficiently charged (step 514) and another indication when its batteries are low on charge (step 518). An indication that its batteries are discharged may be provided through lack of the charged/low charge indicator, or by absence of a "battery ok" indicator when the battery charge is low, or by any of the other techniques described above. At step 516, recording of the low battery charge status is carried out to assist in analyzing whether the behavior of the audience member complies with predetermined usage criteria.

At step 520, the processor 120 determines whether an encoded broadcast has been detected by the device. If so, the identification information extracted therefrom by the device 100 is recorded in memory 116.

At step 528, processor 120 detects whether the device 100 is coupled to the docking station 200 based on the signal from communications interface 150. If the docking status has changed, that is, if the device was docked the last time this test was made and is now not docked, this event is recorded at step 529. Similarly, if the device was not docked the last time this test was made, and is now docked, this event is recorded at step 533. Such records are timestamped with the time that the test was made.

At steps 534–536, battery recharging is performed, if needed. While the battery is recharging, the device continues to record broadcast detections. It is believed that some audience members might find it convenient to dock their monitoring devices as soon as they return home or to dock their devices while watching television or listening to radio at home. In this situation, any broadcasts detected by a device are likely to be heard by the audience member also, and so ought to be recorded.

At step 538, the recorded data stored in memory 116 may be uploaded to the data transfer system, for subsequent transmission to the centralized data processing facility. At step 540, data may be downloaded from the data transfer system to the monitoring device 100. When such data transfer is complete, the device returns to step 520, where it continues detecting and recording broadcast exposure, even if it remains in the docking station.

Each time the monitoring device is removed from the docking station, the monitoring device or the docking station could indicate, for example, the name of the family member to whom the monitoring device is assigned.

If, at step 528, the device detects that it is not coupled to the docking station, then it determines, at step 530, whether it is due for docking. This decision may be based on, for example, elapsed time since the "LOW BATTERY" indication was provided or the amount of unused capacity in memory 116. If docking is needed, at step 532, an appropriate indication is provided through one or more of vibrator 142, sound generator 144, LCD 146 and LED 148.

At step 542, the device checks its internal timer to determine whether the elapsed time is at least the duration of a motion sensing interval. If the timer has not yet reached the length of a motion sensing interval, for example, five minutes, then the device returns to step 504 and continues to detect whether it is being carried.

If the internal timer has reached or exceeded the duration of a motion sensing interval, then the device determines whether it ought to record a motion record in steps 544–566, described in greater detailed hereinbelow. When the device is not docked, the timer functions to segment time into motion sensing intervals, for example, five minutes, and, at step 542, the device detects the end of a motion sensing interval when the timer has reached a value substantially equal to five minutes.

In general, if the device detects a change in whether it is being carried, or not being carried, then this event is recorded as a motion record along with a timestamp. However, if the most recently recorded motion record represents the most recent motion sensing interval, and the most recent record indicates activity different than what occurred in the present interval, the most recently recorded motion record is deleted. This deletion is performed to effectively ignore a change in state that lasts for only one timing interval.

Specifically, at step 544, the number of motion sensings NSENSINGS is compared to a threshold value. The highest sensitivity is obtained when the threshold value is set to zero. A larger number of sensings corresponds to requiring more substantial movement of the motion sensor to determine that motion has occurred during the motion sensing interval. The threshold value is stored in the monitoring device 100 and may be altered through downloading from the centralized facility.

If, at step 544, the number of motion sensings is determined to exceed the threshold, that is, motion is sensed during the present motion sensing interval, then at step 556 it is determined whether any motion records are stored in the memory 116. Immediately after the monitoring device has uploaded its data and been removed from the docking station, the memory 116 is devoid of motion sensing records, and so, at step 558, a first motion record will be recorded and the device returns to step 502 and begins a new motion sensing interval.

If there is at least one motion record stored in the memory 116, then at step 560, the device determines whether there has been a change in state. More specifically, if the most recently recorded motion record indicates motion, and motion was sensed in the present interval, then the device goes from step 560 to step 502, that is, it records nothing and begins a new motion sensing interval.

If there has been a change in state, that is, the most recently recorded motion record indicates no motion, and motion was sensed in the present interval, then the device goes from step 560 to step 562, at which it determines whether the most recently recorded motion record corresponds to the immediately previous motion sensing interval. If it does, then the most recently recorded motion record represents a change in state that lasted for only one motion sensing interval, and, at step 564, the most recently recorded motion record is deleted and the device returns to step 502 to begin a new motion sensing interval.

If the most recently recorded motion record corresponds to a motion sensing interval that lasted for more than one timing interval, then it is preserved, and, at step 566, a new motion record is recorded for the present interval, and the device returns to step 502 to begin a new motion sensing interval.

If, at step 544, the number of motion sensings is determined to be below the threshold, that is, motion is not sensed during the present motion sensing interval, then at step 546 it is determined whether any motion records are stored in the memory 116. If none are stored, then the device returns to step 502 and begins a new motion sensing interval.

When there is at least one motion record stored in the memory 116, then at step 548, the device determines whether there has been a change in state. More specifically, if the most recently recorded motion record indicates no motion, and motion was not sensed in the present interval, then the device goes from step 548 to step 502, that is, it records nothing and begins a new motion sensing interval.

If there has been a change in state, that is, the most recently recorded motion record indicates motion was sensed, and no motion was sensed in the present interval, then the device goes from step 548 to step 550, at which it determines whether the most recently recorded motion record corresponds to the immediately previous motion sensing interval. If it does, then the most recently recorded motion record represents a change in state that lasted for only one motion sensing interval, and, at step 552, the most recently recorded motion record is deleted and the device returns to step 502 to begin a new motion sensing interval.

In the event that the most recently recorded motion record corresponds to a motion sensing interval that lasted for more than one timing interval, then it is preserved, and, at step 554, a new motion record is recorded for the present interval, and the device returns to step 502 to begin a new motion sensing interval.

Figure 2:
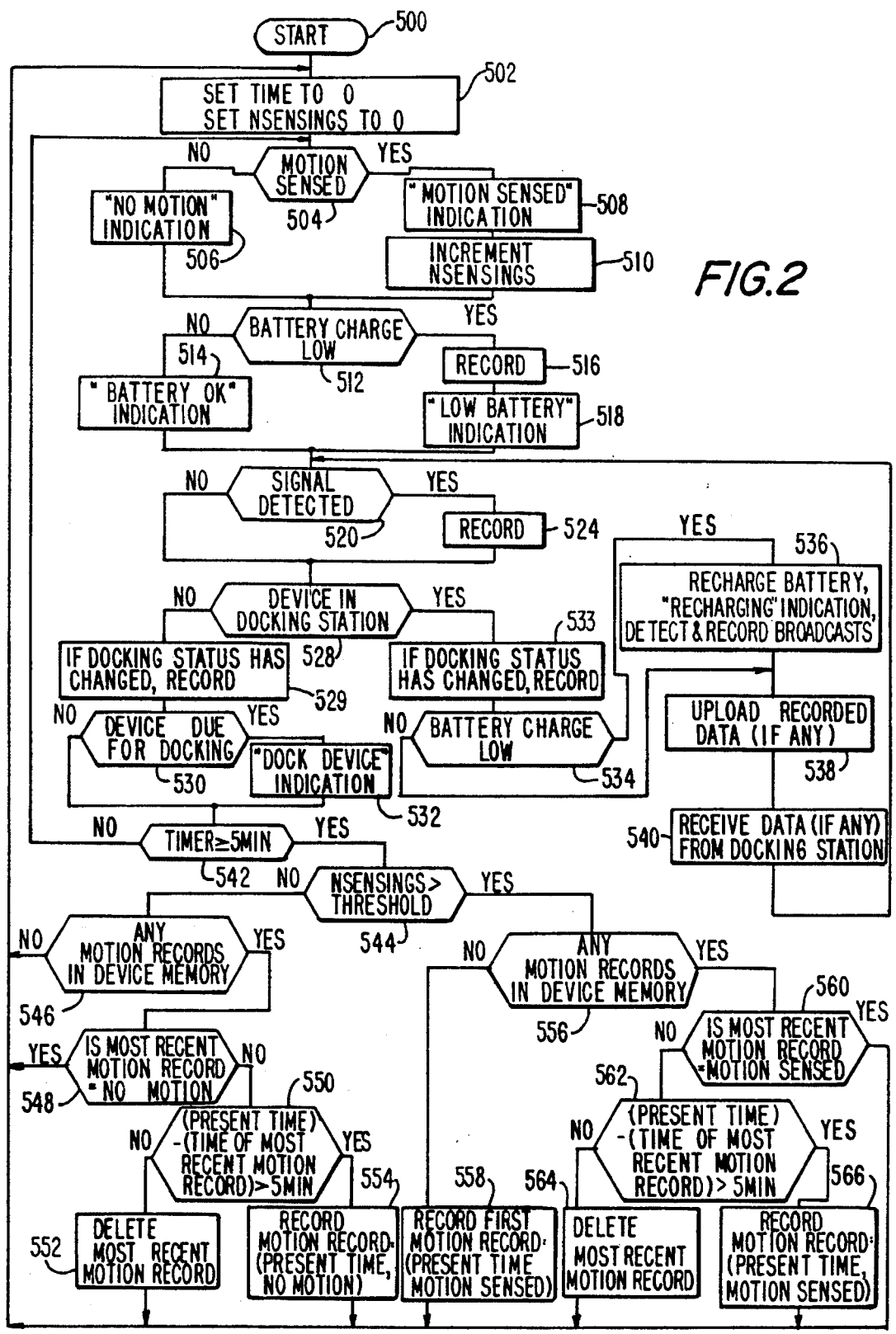
FIG. 2 is a flow chart illustrating the operation of a monitoring device of the FIG. 1 system.

For purposes of simplicity and clarity, the flowchart of FIG. 2 does not reflect gathering of temperature and pressure data with the use of temperature sensor 138 and pressure detector 134. It will be appreciated that such data gathering steps may be incorporated in the device program reflected by the flow chart of FIG. 2, for example, either before or after either of steps 504–510 and steps 520–526.

Figure 3:
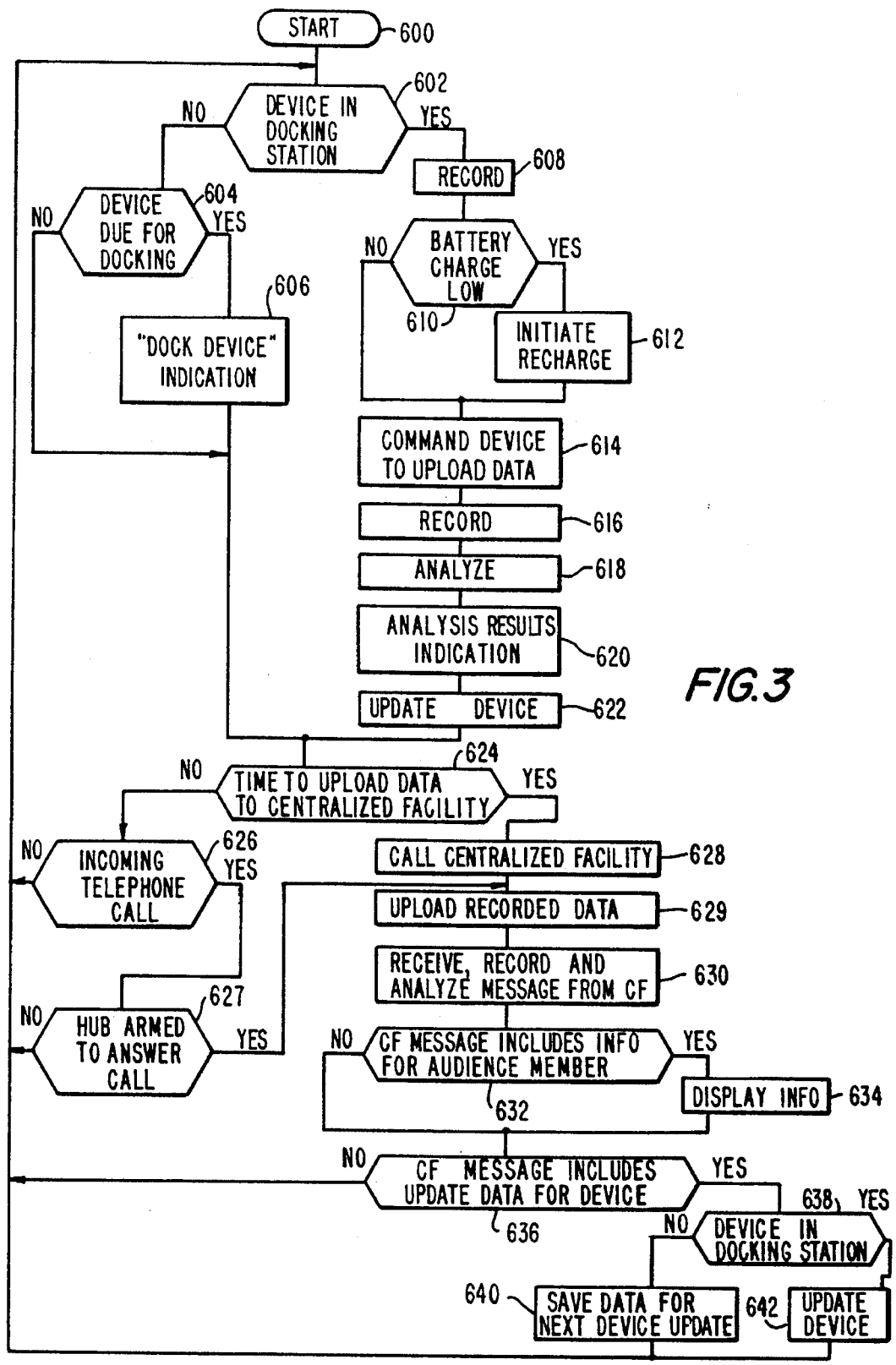
FIG. 3 is a flow chart illustrating the operation of a data transfer system included in the system of FIG. 1.

Operation of the data transfer system will now be described with reference to FIG. 3, which shows a flowchart of its operation.

At step 602, the data transfer system detects whether the monitoring device 100 is coupled thereto, based on one or more of the signals from communications interface 210 and battery status detector 206. In the certain other embodiments such coupling is detected with the use of a magnetic or capacitive detector, or by the state of a switch or the output of an opto-interrupter.

If the monitoring device is not coupled to the docking station, then at step 604, the system determines whether the device ought to be coupled thereto. This determination may be based on elapsed time since last docking, or on usage patterns detected from compliance related data. If necessary, at step 606, an indication that docking is necessary is provided through one or more of sound generator 222, LCD 224 and LED 226.

At step 624, the hub 300 of the data transfer system then determines whether it ought to establish communication with the centralized facility. If the result of this determination is negative, then at step 626, the hub 300 determines whether a call is incoming on the household telephone line. If the result of this determination is negative, then the system returns to step 602. If, however, a call is incoming, it is then determined in step 627 whether the hub 300 is armed to answer a call. That is, the hub 300 is provided with a user operable control (not shown for purposes of simplicity and clarity) which, when activated by a member of the household, enables the hub 300 to answer the next incoming call. The household member arms the hub 300 when he or she receives a telephone call from the centralized facility requesting arming so that the facility can then place a call to the data transfer system through the hub 300. In the event that the hub 300 is not armed when a call comes in, the system returns to step 602.

If, at step 602, it is determined that the monitoring device is coupled to the docking station, then this fact is recorded at step 608, along with the time it occurred. At steps 610–612, recharging of the device battery 130 is initiated, if necessary. At steps 614–616, data may be uploaded from the device. At steps 618–620, the data transfer system analyzes the uploaded data and provides an indication through one or more of sound generator 222, LCD 224 and LED 226 based on the results of the analysis. At step 622, data may be downloaded to the device. If it is determined at steps 624 and 626 that no communication is needed with the centralized facility, then the data transfer device returns to step 602.

If at step 624, however, it is determined that the data transfer system ought to initiate communication with the centralized facility, then at step 628, the system commands the communication interface 310 to establish a dial-up link through the telephone network, and proceeds to step 629. However, if the determination in step 624 is negative, but in steps 626 and 627 an incoming call is detected and the hub is armed, the system proceeds to step 629. At step 629, the hub 300 uploads data stored in memory 216. At step 630, the data transfer system receives, records and analyzes information downloaded from the centralized facility.

At step 632, the data transfer system determines whether the information from the centralized facility includes messages for display to the audience member, such as comments regarding their usage of the monitoring device 100 or notification of rewards or entitlement. If so, at step 634, appropriate notification is indicated to the audience member through one or more of sound generator 222, LCD 224 or LED 226. In the alternative a message included in the information may be stored in memory for display later when the device 100 is coupled with the docking station. Typically, messages for the audience member are displayed just after the monitoring device is coupled with the docking station.

In certain embodiments, a message is displayed beginning at a first predetermined interval after the device is engaged with the docking station (or immediately upon engagement) and the message display continues for a second predetermined interval. In the alternative, the display may be continued either until the unit 100 is disengaged from the docking station or until the unit is once again engaged therewith, or until the occurrence of a different event, such as an acknowledgement entered by the audience member by means of switch 220. In other embodiments, the unit 200 displays a message such as, "YOU HAVE A MESSAGE. PUSH RED BUTTON TO READ", when the device 100 is docked. Pushing the appropriate button (which, for example, can be colored red) enters a display request via switch 220, in response to which the unit 200 proceeds to display one or more stored messages. As indicated above, a scroll button may also be provided for actuating switch 220 to initiate scrolling of the display for display of longer or multiple messages.

At step 636, the data transfer system determines whether the information downloaded from the centralized facility includes information which ought to be transferred to the monitoring device. If not, the data transfer system returns to step 602.

If, however, there is information to be downloaded to the monitoring device, at step 638 the system determines whether the monitoring device is coupled thereto. If not, then at step 640, the system configures itself, such as by setting a software flag, to download the information to the monitoring device the next time it is coupled to the docking station, and returns to step 602. If the monitoring device is determined to be coupled at step 638, then at step 642 the data transfer system downloads information to the monitoring device. In certain embodiments, messages to be displayed to the audience member, including reward messages received from the centralized facility, are downloaded to the monitoring device 100 at this time. The device 100 displays the downloaded messages, for example, by means of the LCD 146. When downloading is complete, the data transfer system returns to step 602.

In another embodiment, the device 100 detects whether it has been docked and then the processor 120 stores in memory an indication of this event, along with a time of docking based on the time signal from clock 118. This capability is advantageous as a backup to the docking indication storage function in the data transfer system, or if the monitoring device is physically returned to the media surveyor for uploading collected data.

The embodiments of the device 100 described above carry out monitoring by detecting a code included in the audio portion of a broadcast. It will be appreciated that the present invention is also applicable for use with devices that monitor broadcasts without detecting such a code, such as by detecting one or more characteristics of a received signal, as well as devices which monitor video signals. Moreover, it will be seen that the present invention is also applicable for use with devices which monitor, but do not record, broadcasts, as well as manual recording devices.

Although illustrative embodiments of the present invention, and various modifications thereof, have been described in detail herein with reference to the accompanying drawings, it is to be understood that the invention is not limited to these embodiments and the described modifications, and that various changes and further modifications may be effected therein by one skilled in the art without departing from the scope or spirit of the invention as defined in the appended claims.

What is claimed is:

1. A system for promoting use by an audience member of a portable broadcast exposure monitoring and/or recording device in accordance with a predetermined usage criterion, comprising:

means for providing a sense signal indicating whether the device is being carried with the person of the audience member;

means for providing a time signal corresponding with the sense signal;

data storage means included with the device for storing the sense signal and the corresponding time signal; and indication means for providing an indication to the audience member based on the sense signal and the corresponding time signal of whether the audience member's usage of the device has been in accordance with the predetermined usage criterion.

2. The system of claim 1, further comprising compliance signal means for providing a compliance signal indicating whether the audience member has used the device in accordance with the predetermined usage criterion based on the sense signal and the corresponding time signal.

3. The system of claim 2, wherein the indication means is operative to provide said indication based on the compliance signal.

4. A system as in claim 1, wherein the indication provided to the audience member represents a cumulative usage of the device by the audience member.

5. A system as in claim 4, wherein the cumulative usage is computed relative to a predetermined starting time.

6. A system as in claim 1, wherein the indication means comprises means for providing an audible indication.

7. A system for promoting use by an audience member of a portable broadcast exposure monitoring and/or recording device in accordance with a predetermined usage criterion, comprising:

means for providing a sense signal indicating whether the device is being carried with the person of the audience member;

means for providing a time signal corresponding with the sense signal; and indication means for providing an indication to the audience member based on the sense signal and the corresponding time signal of whether the audience member's usage of the device has been in accordance with the predetermined usage criterion, the indication representing cumulative usage of the device by the audience member computed for a daily period.

8. A system for promoting use by an audience member of a portable broadcast exposure monitoring and/or recording device in accordance with a predetermined usage criterion, comprising:

means for providing a sense signal indicating whether the device is being carried with the person of the audience member;

means for providing a time signal corresponding with the sense signal; and indication means for providing an indication to the audience member based on the sense signal and the corresponding time signal of whether the audience member's usage of the device has been in accordance with the predetermined usage criterion, the indication representing a reward awarded to the audience member.

9. A system as in claim 8, wherein the reward is awarded to the audience member based on a random selection process.

10. A system as in claim 9, wherein the random selection process comprises a random selection of the audience member from among a selected group of audience members.

11. A system as in claim 8, wherein the reward is awarded to the audience member by selecting the member at random from a group of audience members selected according to compliance data gathered therefor.

12. A system as in claim 8, wherein the reward is based on a cumulative usage of the device by the audience member.

13. A system as in claim 8, wherein the reward is based on usage of the device by the audience member in accordance with the predetermined usage criterion at a predetermined time.

14. A system as in claim 8, further comprising means for providing notification to an audience member that a reward has been awarded to another audience member.

15. A system for promoting use by an audience member of a portable broadcast exposure monitoring and/or recording device in accordance with a predetermined usage criterion, comprising:

means for providing a sense signal indicating whether the device is being carried with the person of the audience member;

means for providing a time signal corresponding with the sense signal;

the device including the means for providing a sense signal and the means for providing a time signal, the system further comprising:

compliance signal means for providing a compliance signal indicating whether the audience member has used the device in accordance with the predetermined usage criterion based on the sense signal and the corresponding time signal;

indication means for providing an indication to the audience member based on the sense signal and the corresponding time signal of whether the audience member's usage of the device has been in accordance with the predetermined usage criterion; and means for transmitting the sense signal and the corresponding time signal from the device for provision to the compliance signal means.

16. A system as in claim 15, wherein the indication means is disposed within the device.

17. A system for promoting use by an audience member of a portable broadcast exposure monitoring and/or recording device in accordance with a predetermined usage criterion, comprising:

means included in the device for providing a sense signal indicating whether the device is being carried with the person of the audience member;

means included in the device for providing a time signal corresponding with the sense signal;

compliance signal means for providing a compliance signal indicating whether the audience member has used the device in accordance with the predetermined usage criterion based on the sense signal and the corresponding time signal;

means for transmitting the sense signal and the corresponding time signal from the device for provision to the compliance signal means;

a data transfer system for coupling with the device to receive the signals transmitted by the means for transmitting; and indication means for providing an indication to the audience member based on the sense signal and the time signal of whether the audience member's usage of the device has been in accordance with the predetermined usage criterion.

18. A system as in claim 17, wherein the data transfer system includes the means for providing an indication of whether the audience member's usage of the device has been in accordance with the predetermined usage criterion.

19. A system as in claim 17, wherein the indication means is disposed within the device.

20. A system as in claim 17, wherein the data transfer system includes a docking station operative to couple with the device, the docking station including the compliance signal means and the indication means therewith.

21. The system of claim 20, wherein the docking station includes means for generating reward signals, the indication means being operative to provide an indication of a reward based on the reward signals.

22. A system for promoting use by an audience member of a portable broadcast exposure monitoring and/or recording device in accordance with a predetermined usage criterion, comprising:

means included in the device for providing a sense signal indicating whether the device is being carried with the person of the audience member;

means included in the device for providing a time signal corresponding with the sense signal;

compliance signal means located at a centralized data processing facility for providing a compliance signal indicating whether the audience member has used the device in accordance with the predetermined usage criterion based on the sense signal and the corresponding time signal, said compliance signal means being operative to receive sense and corresponding time signals from a plurality of monitoring and/or recording devices;

means for transmitting the sense signal and the corresponding time signal from the device for provision to the compliance signal means; and indication means for providing an indication to the audience member based on the sense signal and the corresponding time signal of whether the audience member's usage of the device has been in accordance with the predetermined usage criterion.

23. A system as in claim 22, wherein the centralized data processing facility also includes means for generating reward signals and for transmitting the reward signals to the means for providing an indication.

24. A system as in claim 23, further comprising a data transfer system for transferring data from the device to the centralized data processing facility, the data transfer system including the means for providing an indication of whether the audience member's usage of the monitoring device has been in accordance with the predetermined usage criterion.

25. A system as in claim 23, wherein the indication means is disposed within the device.

26. A system for promoting use by an audience member of a portable broadcast exposure monitoring and/or recording device in accordance with a predetermined usage criterion, comprising:

means for providing a sense signal indicating whether the device is being carried with the person of the audience member;

means for providing a time signal corresponding with the sense signal; and a visual display for providing a visual indication to the audience member based on the sense signal and the corresponding time signal of whether the audience member's usage of the device has been in accordance with the predetermined usage criterion.

27. A system as in claim 26, wherein the visual display comprises at least one of a liquid crystal display and a light emitting diode.

28. A system for promoting use by an audience member of a portable broadcast exposure monitoring and recording device in accordance with a predetermined usage criterion, the device being operative to receive a broadcast audio signal having an identification signal in encoded form therein, decode the encoded identification signal and store the decoded identification signal with a corresponding time signal, comprising:

means for providing a sense signal indicating whether the device is being carried with the person of the audience member;

means for providing a time signal corresponding with the sense signal; and indication means for providing an indication to the audience member based on the sense signal and the corresponding time signal of whether the audience member's usage of the device has been in accordance with the predetermined usage criterion.

29. A method for promoting use by an audience member of a portable broadcast exposure monitoring and/or recording device in accordance with a predetermined usage criterion, comprising the steps of:

providing a sense signal indicating whether the device is being carried with the person of the audience member;

providing a time signal corresponding with the sense signal;

storing the sense signal and the corresponding time signal in the device; and providing an indication to the audience member based on the sense signal and the corresponding time signal of whether the audience member's usage of the device has been in accordance with the predetermined usage criterion.

30. A method as in claim 29, further comprising the step of providing a compliance signal indicating whether the audience member has used the device in accordance with the predetermined usage criterion based on the sense signal and the corresponding time signal.

31. A method as in claim 29, wherein the indication provided to the audience member represents a cumulative usage of the device by the audience member.

32. A method for promoting use by an audience member of a portable broadcast exposure monitoring and/or recording device in accordance with a predetermined usage criterion, comprising the steps of:

providing a sense signal indicating whether the device is being carried with the person of the audience member;

providing a time signal corresponding with the sense signal; and providing an indication to the audience member based on the sense signal and the corresponding time signal of whether the audience member's usage of the device has been in accordance with the predetermined usage criterion, the indication representing a reward awarded to the audience member.

33. A method as in claim 32, further comprising the step of notifying an audience member that a reward has been awarded to another audience member.

34. A method for promoting use by an audience member of a portable broadcast exposure monitoring and recording device in accordance with a predetermined usage criterion, the device being operative to receive a broadcast audio signal having an identification signal in encoded form therein, decode the encoded identification signal and store the decoded identification signal with a corresponding time signal, comprising the steps of:

providing a sense signal indicating whether the device is being carried with the person of the audience member;

providing a time signal corresponding with the sense signal; and providing an indication to the audience member based on the sense signal and corresponding time signal of whether the audience member's usage of the device has been in accordance with the predetermined usage criterion.

35. A system for promoting usage by an audience member of a portable broadcast exposure monitoring and/or recording device in accordance with a predetermined usage criterion, the device being operative to acquire and/or store broadcast exposure data and to couple with a data transfer system under the control of the audience member to provide data to the data transfer system from the device, comprising:

sensing means for providing a sense signal in response to coupling of the device with the data transfer system;

means for providing a time signal corresponding with the sense signal;

compliance signal means for providing a compliance signal indicating whether the device was coupled with the data transfer system within a predetermined coupling time frame based on the sense signal and the corresponding time signal; and coupling indication means for providing an indication to the audience member based on the compliance signal of whether the audience member has coupled the device with the data transfer system within the predetermined coupling time frame.

36. A system as in claim 35, wherein the indication provided to the audience member represents a cumulative number of times that the audience member has coupled the device to the data transfer system within the predetermined coupling time frame.

37. A system as in claim 36, wherein the cumulative number of times is computed relative to a predetermined starting time.

38. A system as in claim 35, wherein the indication provided to the audience member represents a reward awarded to the audience member.

39. A system as in claim 38, wherein the reward is awarded to the audience member based on a random selection process and conditioned on coupling of the device with the data transfer system within said predetermined coupling time frame determined based on the compliance signal.

40. A system as in claim 38, wherein the reward relates to a cumulative number of times of coupling the monitoring device by the audience member within the predetermined coupling time frame.

41. A system as in claim 40, wherein the reward relates to the coupling of the device by the audience member in accordance with the predetermined usage criterion at a particular time.

42. A system as in claim 38, further comprising means for providing notification to an audience member that a reward was awarded to another audience member.

43. A system as in claim 35, wherein the data transfer system includes the means for providing a sense signal, the means for providing a time signal, and the coupling indication means.

44. A system as in claim 43, wherein the data transfer system includes the compliance signal means.

45. A system as in claim 44, wherein the indication provided to the audience member represents a reward awarded to the audience member.

46. A system as in claim 35, wherein the device includes the coupling indication means.

47. A system as in claim 35, wherein the compliance signal means is located at a centralized data processing facility.

48. A system as in claim 47, wherein the data transfer system includes means for transmitting the sense signal and corresponding time signal to the compliance signal means, and the compliance signal means includes means for transmitting the compliance signal to the data transfer system.

49. A system as in claim 48, wherein the indication provided to the audience member represents a reward awarded to the audience member.

50. A system as in claim 35, wherein the device includes a rechargeable battery, and the data transfer system includes means for recharging the rechargeable battery.

51. A system as in claim 50, wherein the device includes means for providing a low battery charge indication.

52. A system for promoting usage by an audience member of a portable broadcast exposure monitoring and recording device in accordance with a predetermined usage criterion, the device being operative to receive a broadcast audio signal having an identification signal in encoded form therein, decode the encoded identification signal, store the decoded identification signal with a corresponding time signal, and couple with a data transfer system under the control of the audience member to provide the decoded identification signal and corresponding time signal to the data transfer system from the device, comprising:

sensing means for providing a sense signal in response to coupling of the device with the data transfer system;

means for providing a sense time signal corresponding with the sense signal;

compliance signal means for providing a compliance signal indicating whether the device was coupled with the data transfer system within a predetermined coupling time frame based on the sense signal and the corresponding sense time signal; and coupling indication means for providing an indication to the audience member based on the compliance signal of whether the audience member has coupled the device with the data transfer system within the predetermined coupling time frame.

53. A method for promoting usage by an audience member of a portable broadcast exposure monitoring and/or recording device in accordance with a predetermined usage criterion, the device being operative to acquire and/or store broadcast exposure data and to couple with a data transfer system under the control of the audience member to provide data to the data transfer system from the device, comprising the steps of:

providing a sense signal in response to coupling of the device with the data transfer system;

providing a time signal corresponding with the sense signal;

providing a compliance signal indicating whether the device was coupled with the data transfer system within a predetermined coupling time frame based on the sense signal and corresponding time signal; and providing an indication to the audience member based on the compliance signal of whether the audience member has coupled the device with the data transfer system within the predetermined coupling time frame.

54. A method as in claim 53, wherein the indication provided to the audience member represents a cumulative number of times that the audience member has coupled the device to the data transfer system within the predetermined coupling time frame.

55. A method as in claim 53, wherein the indication provided to the audience member represents a reward awarded to the audience member.

56. A method as in claim 53, further comprising the step of notifying an audience member that a reward has been awarded to another audience member.

57. A method for promoting usage by an audience member of a portable broadcast exposure monitoring and recording device in accordance with a predetermined usage criterion, the device being operative to receive a broadcast audio signal having an identification signal in encoded form therein, decode the encoded identification signal, store the decoded identification signal with a corresponding time signal, and couple with a data transfer system under the control of the audience member to provide the decoded identification signal and corresponding time signal to the data transfer system from the device, comprising the steps of:

providing a sense signal in response to coupling of the device with the data transfer system;

providing a sense time signal corresponding with the sense signal;

providing a compliance signal indicating whether the device was coupled with the data transfer system within a predetermined coupling time frame based on the sense signal and corresponding sense time signal;

providing an indication to the audience member based on the compliance signal of whether the audience member has coupled the device with the data transfer system within the predetermined coupling time frame.

58. A system for promoting use by an audience member of a portable broadcast exposure monitoring and/or recording device in accordance with a predetermined usage criterion, comprising:

means for providing a sense signal indicating whether the device is being carried with the person of the audience member;

means for providing an operational state signal from time to time, the operational state signal indicating whether said device is in an operating state for monitoring broadcast exposure; and means for providing a plurality of indications to the audience member, each of the plurality of indications being provided at a different respective time, each of the plurality of indications indicating that the device is in the operating state based on the operational state signal and the sense signal.

59. A system as in claim 58, wherein the means for providing the operational state signal includes means for providing an indication that the device is operative to detect and store broadcast exposure data.

60. A system as in claim 58, wherein the means for providing a plurality of indications comprises a visual display.

61. A system as in claim 60, wherein the visual display comprises at least one of a liquid crystal display and a light emitting diode.

62. A system as in claim 58, wherein the means for providing the plurality of indications comprises means for providing an audible indication.

63. A system for promoting use by an audience member of a portable broadcast exposure monitoring and recording device in accordance with a predetermined usage criterion, the device being operative to receive a broadcast audio signal having an identification signal in encoded form therein, decode the encoded identification signal and store the decoded identification signal with a corresponding time signal, comprising:

means for providing a sense signal indicating whether the device is being carried with the person of the audience member;

means for providing an operational state signal from time to time, the operational state signal indicating whether said device is in an operating state for monitoring broadcast exposure; and means for providing a plurality of indications to the audience member, each of the plurality of indications being provided at a different respective time, each of the plurality of indications indicating that the device is in the operating state based on the operational state signal and the sense signal.

64. A method for promoting use by an audience member of a portable broadcast exposure monitoring and/or recording device in accordance with a predetermined usage criterion, comprising the steps of:

providing a sense signal indicating whether the device is being carried with the person of the audience member;

providing an operational state signal from time to time, the operational state signal indicating whether said device is in an operating state for monitoring broadcast exposure; and providing a plurality of indications to the audience member, each of the plurality of indications being provided at a different respective time, each of the plurality of indications indicating that the device is in the operating state based on the operational state signal and the sense signal.

65. A method for promoting use by an audience member of a portable broadcast exposure monitoring and recording device in accordance with a predetermined usage criterion, the device being operative to receive a broadcast audio signal having an identification signal in encoded form therein, decode the encoded identification signal and store the decoded identification signal with a corresponding time signal, comprising the steps of:

providing a sense signal indicating whether the device is being carried with the person of the audience member;

providing an operational state signal from time to time, the operational state signal indicating whether said device is in an operating state for monitoring broadcast exposure; and providing a plurality of indications to the audience member, each of the plurality of indications being provided at a different respective time, each of the plurality of indications indicating that the device is in the operating state based on the operational state signal and the sense signal.

66. A system as in claim 1, wherein the predetermined usage criterion does not depend on exposure to a broadcast.

* * * * *